United States Patent [19]

Kennedy et al.

[11] Patent Number: 5,351,367
[45] Date of Patent: Oct. 4, 1994

[54] LINE TENSIONER

[75] Inventors: E. Scot Kennedy, Hinckley; Winston H. Breeden, Jr., Westlake, both of Ohio

[73] Assignee: Arcadia Management Co., Inc., Cleveland, Ohio

[21] Appl. No.: 26,497

[22] Filed: Mar. 4, 1993

[51] Int. Cl.⁵ .................. B65D 63/00; A44B 19/00
[52] U.S. Cl. ................... 24/129 R; 410/100; 24/300
[58] Field of Search ............ 410/96, 97, 99, 100, 410/103; 24/298, 300, 301, 129 R, 129 D, 130, 68 CD

[56] References Cited

U.S. PATENT DOCUMENTS

| | | |
|---|---|---|
| 507,454 | 10/1893 | Rogers . |
| 895,590 | 8/1908 | Sprague . |
| 1,083,958 | 1/1914 | Tod ................... 24/129 R |
| 1,982,444 | 11/1934 | Miller . |
| 2,065,577 | 12/1936 | Gladstone . |
| 2,097,048 | 10/1937 | Statler . |
| 2,273,136 | 2/1942 | Orech et al. ............ 24/129 R |
| 2,506,274 | 5/1950 | Maxwell et al. ........ 24/129 R |
| 2,557,499 | 6/1951 | Davis . |
| 2,896,283 | 7/1959 | Huber . |
| 3,050,799 | 8/1962 | Davis . |
| 3,094,755 | 6/1963 | Casanave ............... 24/129 R |
| 3,866,272 | 2/1975 | Prete, Jr. et al. . |
| 3,887,966 | 6/1975 | Gley . |
| 4,220,306 | 9/1980 | Cueto et al. ........... 24/129 R X |
| 4,377,886 | 3/1983 | Golden .................. 24/71.1 |
| 4,529,240 | 7/1985 | Engel ................... 24/129 R X |
| 4,584,741 | 4/1986 | Kawahara et al. ...... 24/68 CD |
| 4,733,862 | 3/1988 | Miller ................... 24/129 R X |
| 4,762,318 | 8/1988 | Phillips et al. ......... 272/137 |
| 4,860,408 | 8/1989 | Johnson ................ 24/300 |
| 5,035,558 | 7/1991 | Prosen ................... 410/96 |
| 5,168,605 | 12/1992 | Bartlett ................. 24/300 X |

FOREIGN PATENT DOCUMENTS 2045304 10/1980 United Kingdom ............ 24/129 R

*Primary Examiner*—Frank E. Werner
*Assistant Examiner*—Stephen Gordon
*Attorney, Agent, or Firm*—Fay, Sharpe, Beall, Fagan, Minnich & McKee

[57] ABSTRACT

A line tensioner includes a tensioner body and a first bore extending through the tensioner body. A second bore extends through the tensioner body in a manner spaced from the first bore. Also extending through the tensioner body are a third bore and a fourth bore which are spaced from the first and second bores as well as from each other. A line extends through the four bores of the tensioner body. The length of the line can be selectively adjusted by movement of the tensioner body. The desired length of line can then be tensioned in order to prevent a lengthening of the line.

29 Claims, 3 Drawing Sheets

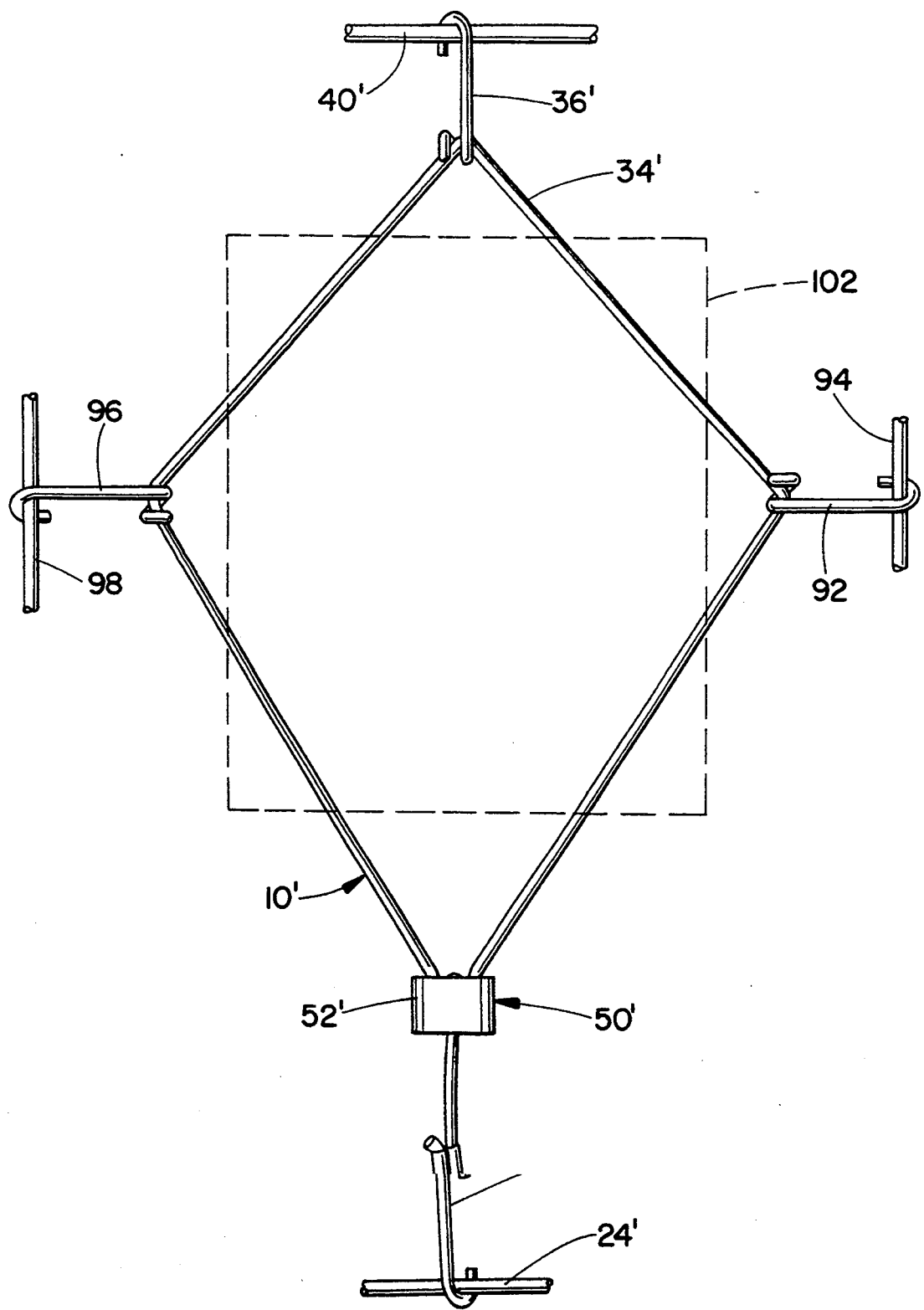

LINE TENSIONER

BACKGROUND OF THE INVENTION

The present invention relates generally to devices for producing tension in a line. More particularly, the present invention relates to line tensioner used with adjustable length straps which are useful, for example, in securing a cargo object in place.

The invention is particularly applicable to adjustable length stretchable flexible cargo straps, sometimes known as bungee cords, which are particularly useful for retaining a load in place on, e.g., a vehicle. However, it should be appreciated by those of average skill in the art that the invention has broader applications and may also be adapted for use in many other environments where it is desired to tighten cable, rope, webbing or the like, such as, e.g., tightening a tent rope, a guy wire, a sailing line and so on.

Line tightener and snubbing devices for use with guy ropes and the like permit the effective shortening of a rope to take out the slack and secure it in the tightened position. Prior devices, while they provided for the tightening action and the prevention of slippage, were rather difficult to adjust because of the frictional action of the rope in passing through the device. Also, the known devices of this sort are not simple and inexpensive to manufacture, nor are they easy to use and most of them have several movable parts.

Several types of stretchable flexible cargo straps are known. Light duty cargo straps have been used to hold small articles in place on, e.g. the luggage carriers of bicycles. Medium duty cargo straps have been used to secure luggage, sailboards, skis, lumber, ladders, pipes and the like to cartop carriers or racks on pickup trucks. Heavy duty straps have been employed to secure aircraft to the decks of aircraft carriers. Typically, an attachment means, such as a hook is provided at each end of such flexible cargo straps.

The known stretchable cargo straps have, been the subject of several limitations including, for example, a breakage of the strap. Perhaps the most important limitation of known cargo straps is that it is difficult to maintain the desired amount of tensioning force on the strap. Normally, a stretchable support strap has a given free length or unstretched length. For use, such a strap needs to be stretched to near its maximum "stretchable length" so as to provide an effective tension force to hold a cargo in place. Obviously, the strap should not be stretched past its maximum stretchable length as it will break the strap. Conventionally, one must buy several lengths of straps and experiment to find the right length of strap for a particular job.

In order to vary the stretchable length of a strap, some users pass the hook provided on one end of the cargo strap around a support and then hook it to a central portion of the strap. As this hook slides along the central portion of the cargo strap, the tension in the stretchable cargo strap is diminished and the strap only loosely holds the cargo object to the carrier. This may result in the cargo object being separated from the carrier due to, e.g. wind knocking a surfboard attached to a cartop carrier of a moving vehicle from the vehicle. Obviously, the separation of cargo from its vehicle can cause accidents which should be avoided at all costs. Conventional line tightening devices are not adapted for use with such straps. Even when used with such stretchable flexible cargo straps, they are still subject to the disadvantages mentioned previously.

One improvement on such conventional cargo straps, while it prevents a loosening of the cargo strap, is not infinitely adjustable and is disadvantageous from that standpoint. In addition, this known device necessitates the use of a separate fastening chain located within a tubular stretchable cargo strap. This known cargo strap is not usable with conventional line tightening devices due to the provision of the fastening chain within the strap.

It has therefore been considered desirable to develop a new and improved line tensioner device, for stretchable cargo straps and other types of line, which would overcome the foregoing difficulties and others while providing better and more advantageous overall results.

BRIEF SUMMARY OF THE INVENTION

In accordance with the present invention, a line tensioner device is provided.

More particularly in accordance with this aspect of the invention, the line tensioner comprises a tensioner body, a first bore extending through the tensioner body and a second bore extending through the tensioner body with the second bore being spaced from the first bore. A third bore extends through the tensioner body with the third bore being spaced from the first and second bores. A fourth bore extends through the tensioner body with the fourth bore being spaced from the first, second and third bores.

Preferably, a first countersunk area communicates with the first bore. A second countersunk area can communicate with the second and third bores. A third countersunk area can communicate with the third and fourth bores. The second and third countersunk areas can be located on opposite sides of the body. Preferably, the first, second, third and fourth bores are non-intersecting and are substantially parallel to each other.

In accordance with another aspect of the present invention, a tensioning device for a flexible tensioning member such as a line is provided.

More particularly in accordance with this aspect of the invention, the device comprises a tensioner body comprising a first end, a second end and at least two bores which extend through the body from the first end to the second end. A line extends through the tensioner body at least two bores. A means is provided for selectively binding the line to prevent a sliding motion thereof in relation to the body. The means is located in the body and comprises a first locking surface located adjacent the first end of the body and a second locking surface located adjacent the second end of the body.

Preferably, the at least two bores comprise a first bore and a second bore that is spaced from the first bore. The first locking surface comprises a first countersunk area in the body with the first countersunk area communicating with the first and second bores. The line extends through the first bore, the first countersunk area and the second bore in a loop. The tensioner further comprises a third bore extending from the body first end to the body second end. The third bore is spaced from the first and second bores. The second locking surface preferably comprises a second countersunk area in the body which communicates with the second and third bores, the line extending through the second bore, the second countersunk area and the third bore in a loop. The tensioner device preferably further comprises a fourth bore extending from the body first end to the second end and a means for preventing a sliding motion of the line in one direction in the fourth bore past a preselected point. Preferably, the means for preventing the sliding motion comprises a countersunk area in communication with the fourth bore.

According to still another aspect of the invention, a method is provided for securing a cargo to a cargo carrier.

More particularly in accordance with this aspect of the invention, the method comprises the step of providing an adjustable length cargo strap device comprising a tensioner body having a first end, a second end and at least two bores which extend from the first end to the second end, a line which extends through the tensioner body at least two bores and a means for selectively binding the line to prevent a sliding motion thereof in relation to the body with the means being located in the body. The first attachment means is located on the line and positioned on one side of the tensioner body and a second attachment means is located on the line and positioned on another side of the tensioner body. The first attachment means is secured to a first cargo carrier element and the second attachment means is secured to a second cargo carrier element. The tensioner body is slid in relation to the first and second attachment means until the slack is removed from the line. The line is tensioned by sliding the tensioner body further until the line is taut.

One advantage of the present invention is the provision of a new and improved line tensioner device that can be used to tighten any flexible line, such as cable, rope, webbing or the like, whether or not such line is stretchable.

Another advantage of the present invention is the provision of a line tensioner device which has no moving parts and is thus simple to use and easy and inexpensive to manufacture.

Still another advantage of the present invention is the provision of a line tensioner which comprises a tensioner body including a plurality of spaced bores through which the line to be tensioned extends.

Yet another advantage of the present invention is the provision of a line tensioner having a tensioner body which includes a means for selectively binding a line that extends through the body. Preferably, the means for selectively binding comprises first and second locking surfaces which are located on opposite sides of the body.

Still yet another advantage of the present invention is the provision of an inexpensive, easy to use, adjustable length line and preferably an adjustable length bungee cord or resilient cargo strap. This allows for multiple free length positions when using one length of resilient strap. That, in turn, enables one to provide the exact "stretchable length" to provide the necessary tension to hold a cargo object in place but yet not stretch the cargo strap past its maximum stretchable length thereby causing it to fail.

A further advantage of the present invention is the provision of an adjustable length line with slidable and selectively dismountable hooks- Through the use of such hooks, the line can selectively be turned into a web by the addition of further hooks intermediate the two end hooks on the line.

A still further advantage of the present invention is the provision of a line tensioner having a tensioner body including countersunk areas into which selected portions of a line can be fitted. This can prove advantageous in reducing the overall size of the tensioner device.

A yet further advantage of the present invention is the provision of a new and improved method for securing a cargo to a cargo carrier.

Still further advantages of the invention will become apparent to those skilled in the art upon a reading and understanding of the following detailed specification.

BRIEF DESCRIPTION OF THE DRAWINGS

The invention may take physical form in certain parts and arrangements of parts, several embodiments of which will be described in detail in this specification and illustrated in the accompanying drawings which form a part hereof and wherein.

DETAILED DESCRIPTION OF THE PREFERRED EMBODIMENTS

Figure 1A:
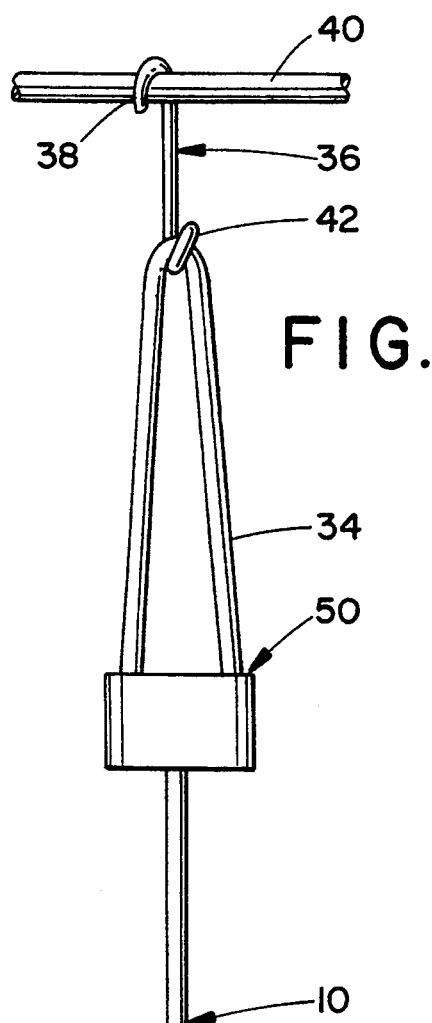
FIG. 1A is a top plan view of an adjustable length cargo strap according to the present invention.

Referring now to the drawings, wherein the showings are for purposes of illustrating preferred embodiments of the invention only and not for purposes of limiting same, FIGS. 1A and 7 illustrate different configurations for a cargo strap according to the present invention. While the cargo strap and its tensioner device will be described and illustrated particularly in connection with stretchable resilient lines such as bungee cords, it should be appreciated that the inventive tensioner device can be utilized with any type of cable, rope or webbing whether or not such line is resiliently extensible and contractable.

With reference now to FIG. 1A, the cargo strap and tensioning device includes a line 10 having a first end 12 adjacent which a first loop 14 is formed by securing the first end 12 to an adjacent line portion 16 by means of a suitable conventional fastener 18. A first hook 20 is selectively secured in the loop 14. The first hook has a first end 22 which engages a first support member 24 and a second end 26 which comprises at least one coil so as to allow the line loop 14 to selectively extend through the coil and thereby secure the hook 20 in place on the line 10. The hook 20 can be selectively dismounted from the loop 14.

The line 10 can be a stretchable, flexible cargo strap which has the property of generating restoring force when stretched from a relaxed condition to a tensioned condition. Such straps are known and available from, e.g. Stretch Products of West Warwick, R.I. The line can be, e.g. 5/16 inch thick fiberglass stranded cord which is covered with a cloth material to prevent a fraying of the strands of the cord. It should be appreciated, however, that the line 10 could also be made from substantially unstretchable cables, ropes or webs.

Figure 1B:
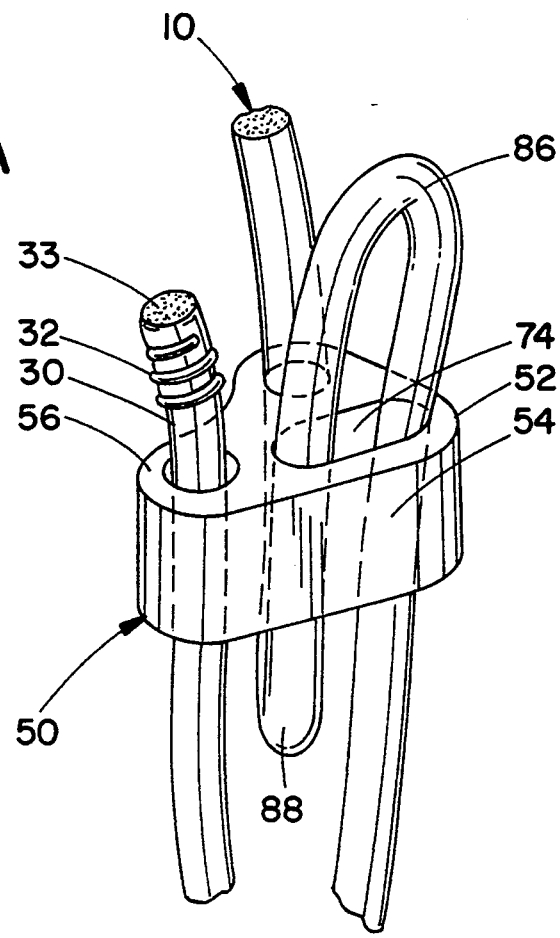
FIG. 1B is an enlarged perspective view of a central portion of the cargo strap of FIG. 1A, in an upside down orientation, with a line extending through a tensioner body being shown in an untensioned, extended state.

As shown in FIG. 1B, located on a second end 30 of the line is an anchor means 32. This can, if desired, comprise a simple loop or coil of a suitable conventional wire material which is crimped into place on the line end. In order to prevent fraying, a suitable potting material 33 can be provided on each end face of the line 10. With reference again to FIG. 1A, a second loop 34 is provided in the line in a spaced manner from the first loop 14. Slidably secured in the second loop is a second hook This hook has a first end 38 which engages a suitable conventional second support member 40. The second hook also has a second coiled end 42 through which the second loop 34 extends. The first and second support members 24 and 40 may be, e.g. the parallel spaced side rails of luggage rack on a motor vehicle.

Figure 2:
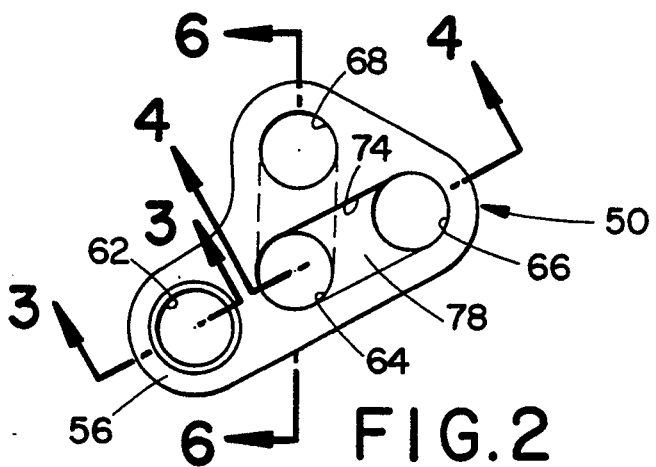
FIG. 2 is a top plan view of the tensioner body of FIG. 1B.
Figure 5:
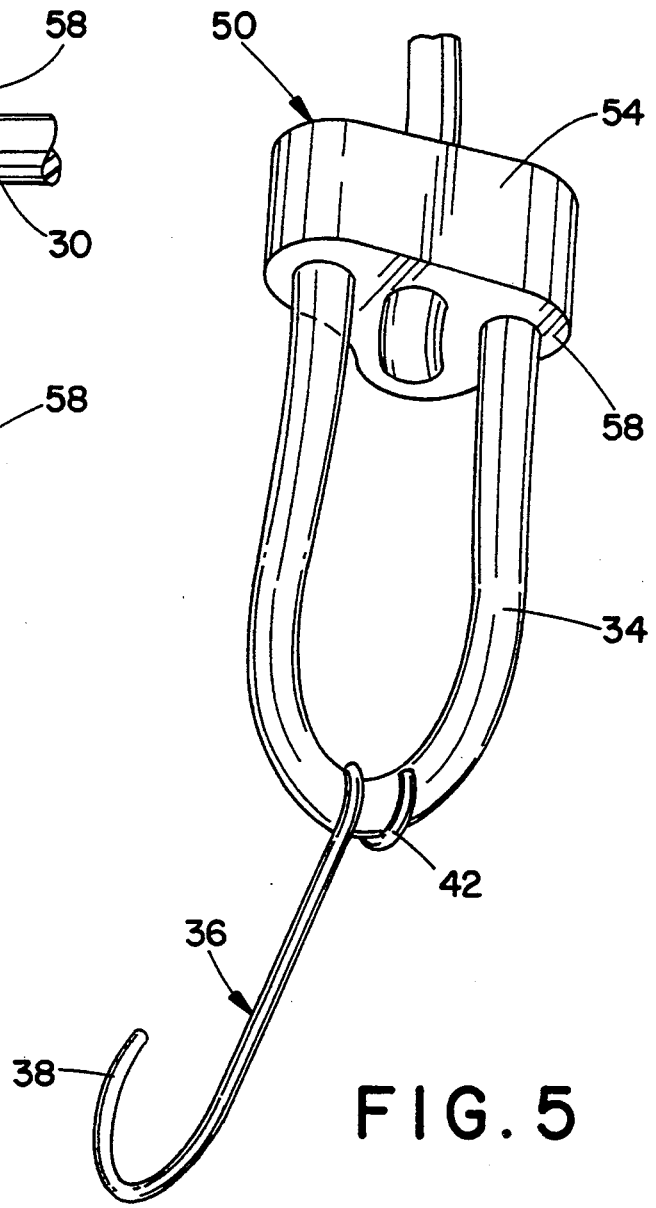
FIG. 5 is an enlarged perspective view of an upper portion of the cargo strap of FIG. 1A in an upside down orientation.

Also provided is a tensioner 50. With reference now to FIG. 1B, the tensioner includes a polygonal body The body 52 can have any desired shape. In the illustrated embodiment, the body has three side surfaces 54 (only one of which is visible in FIG. 1B), a first end surface 56 and a second end surface 58 (FIG. 5). With reference now also to FIG. 2, the tensioner 50 includes a first bore 62, a second bore 64, a third bore 66 and a fourth bore 68. Preferably, the four bores are spaced from each other and have the same diameter. In addition, the bores are preferably non-intersecting and are substantially parallel to each other. Each of the bores extends from the first end surface 56 to the second end surface 58 of the tensioner body 52.

Figure 3:
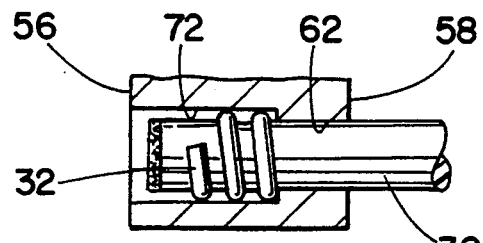
FIG. 3 is a cross-sectional view through the tensioner body of FIG. 2 along line 3—3.

With reference now to FIG. 3, the first bore 62 can be countersunk so as to have an enlarged diameter section 72. Preferably, the enlarged diameter section 72 is colinear with the bore 62. This houses the line second end 30 and the anchor means 32. The latter contacts a shoulder of the bore to prevent the line end 30 from being pulled through the body 52. The first countersunk section 72 extends into the body from the first end surface 56 thereof. The bore 62 can be positioned in the body 52 anywhere in a 360° circle around the remaining trio of bores 64, 66 and 68 since the location of the first bore is not critical. On the other hand, the three other bores need to maintain a specific orientation with regard to each other.

Figure 6:
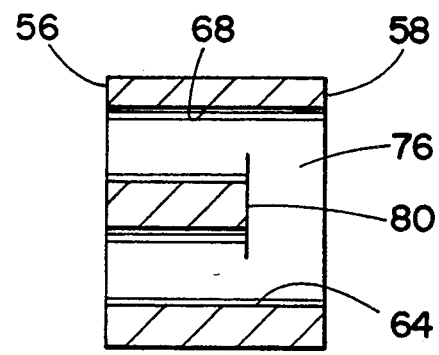
FIG. 6 is a cross-sectional view through the tensioner body of FIG. 2 along line 6—6; and, FIG. 7 is a top plan view of another embodiment of the cargo strap according to the present invention.
Figure 4:
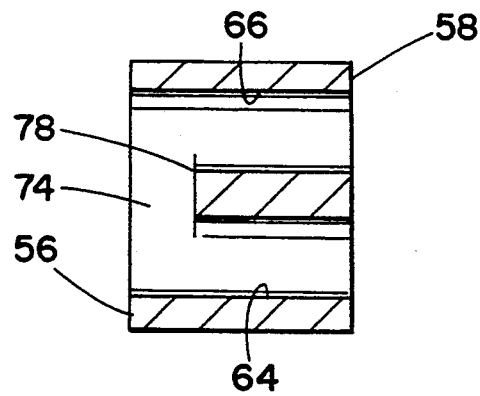
FIG. 4 is a cross-sectional view through the tensioner body of FIG. 2 along line 4—4.

With reference now also to FIG. 4, also provided in the tensioner body 52 is a second countersunk area 74 which communicates with the second and third bores 64 and 66. The second countersunk area 74 extends into the body from the first end surface 56 thereof. With reference now also to FIG. 6, the body further includes a third countersunk area 76 which communicates the second bore 64 with the fourth bore 68. The third countersunk area 76 extends into the body from the second end surface 58 thereof.

Formed in the second countersunk area 74 is a first locking surface 78. Formed in the third countersunk area 76 is a second locking surface 80. Each of the locking surfaces comprises a wall section defined by two of the bores 64, 66 and 64, 68. It is evident that the locking surfaces 78 and 80 are oriented normal to the respective sets of bores 64 and 66 and 64 and 68. With reference now also to FIG. 1B, located in the second countersunk area 74 is a third loop 86 of the line 10. Located in the third countersunk area 76 (FIG. 6) is a fourth loop 88. It evident that the two loops 86 and 88 of the line are offset from each other by an acute angle. That is, the center lines extending through the two sets of bores 64, 66 and 64, 68 as evidenced by the cross-sectional lines 4—4 and 6—6 are spaced from each other by an acute angle. When these loops are pulled tight in the tensioner 50, the respective locking surfaces 78 and 80 will engage the line 10 and will prevent any movement of the line 10 in relation to the tensioner.

With reference again to FIG. 1A, slack in the line 10 can be taken up by the tensioner 50 when the hooks 20 and 36 are in place on the support members 24 and 40. During this time, the tensioner device 50 moves easily in 10' relation to the line 10 as there is no tension on the line. Once the slack has been taken out of the system, the tensioner 50 holds the line tight and prevents any movement of the line 10 and the tensioner in relationship to each other. This occurs since the tensioner body 52 forces the line 10 to make two 180° turns as is evident from FIG. 1B. This configuration of the tensioner body allows the pulling forces on the two hooks 20 and 36 to cancel each other as the line is being pulled in precisely opposite directions out bore 68 (FIG. 1B) and bore 66 (FIG. 5).

It is noted that smooth, curved corners are provided in the tensioner device 50, i.e. at the locking surfaces 78 and 80 so as to prevent any fraying of the line 10 as it makes fairly tight radius bends within the tensioner body. It should be evident that the larger the radius of the bend, i.e. the larger the spacing of the two adjacent bores in the tensioner body 52, the more there would be a tendency for the line 10 to slip. Therefore, the bends or loops of the line are kept fairly tight.

Both sections of the line 10, where the hooks 20 and 36 are mounted, are comprised of loop portions 14 and 34. Such loops are advantageous in that there is less strain produced on the line by the hooks as the tension of the hook on the line is borne by both sections of line.

To secure a cargo to a cargo carrier, illustrated only by the pair of support members 24 and 40 in FIG. 1A, one provides an adjustable length cargo strap device that includes the line 10 and the tensioner body 50. The first hook 20 or attachment means is secured to the first support member or cargo carrier element 24 and the second hook or attachment means 36 is secured to the second support member or cargo carrier element 40. The tensioner body 50 is then slid in relation to the two hooks 20 and 36 until the slack is removed from the line 10. Thereafter, a tension can be exerted on the line 10 by further sliding the tensioning body 52 until the line is taut and the means for selectively binding the line 10 prevents a sliding motion thereof in relation to the tensioner body 52. If the line 10 is a resilient extensible line, the line can be stretched during the step of tensioning.

The tensioner body itself can be advantageously injection molded from a suitable thermoplastic material. On the other hand, the tensioner body could be made from a suitable metal and investment cast. Alternatively, the tensioner body could be made from a powdered metal and formed by way of any suitable conventional forming process such as hot isostatic pressure or the like. Plastic materials are preferred for the tensioner body since plastics are light, durable and of low cost. The tensioner body can be provided in different sizes, i.e. with different bore diameters for the bores 62, 64, 66 and 68 depending upon the diameter of the line 10 which is used. In this connection, three different conventional sizes of bungee cord type resilient extensible cable or cord are known. These are $\frac{1}{4}$ inch diameter (0.635 cm.), 5/16 inch diameter (0.794 cm.) and ⅜ inch diameter (0.953 cm.) lines. Such lines can come in either 3 or 6 foot lengths. Accordingly, different sizes of tensioner bodies 52 can be provided suitably mated to the right diameter line.

In one embodiment of the device, the tensioner body has a larger dimension of 1.44 inches (3.66 cm.) and a smaller dimension of approximately 1 inch (2.54 cm.) with a thickness of 0.81 inches (2.06 cm.) The center line to center line distance between, e.g. the second and third bore 64 and 66, can be on the order of 0.44 inches (1.12 cm). This size tensioner has proven adequate for a cord having a ⅜ inch diameter and a length of 6 feet. The diameter of the several bores 62, 64, 66 and 68 can be on the order of 0.375 inches (0.953 cm.).

The hooks 20 and 36 can be made out of a suitable plastic material, out of a metallic material, such as a wire, or out of a rubber coated metal. While only one type of slidable, selectively dismountable hook has been illustrated, it should be evident that other conventional hooks of this type can also be utilized. In addition, attachment means other than hooks can be mounted on the line 10. Such attachment means could comprise, e.g., rings, straps, links of chain, or the like. Each of these could be slidable along the line 10 and selectively dismountable if desired.

With reference now to FIG. 7, an alternate embodiment of the invention is there illustrated. For ease of appreciation and understanding of this embodiment of the invention, like components are identified by like numerals with a primed (') suffix and new components are identified by new numerals.

In this embodiment, a line 10' has on it a tensioner body 52'. A first hook 20' is secured in a first loop 14' adjacent one end of the line 10'. A second hook 36' is secured in a second loop 34' of the line 10', spaced from the first loop. The loop 34' is rather large in size and affords room for slidably mounting a pair of additional hooks. In this regard, a third hook 92 is secured to a third support member 94 and, spaced therefrom, a fourth hook 96 is secured to a fourth support member 98. In this way, a web-like arrangement can be formed which may prove advantageous in securing a sizeable piece of cargo 102 to, e.g., a roof mounted carrier on a vehicle or the like.

The invention has been described with reference to preferred embodiments. Obviously, modifications and alterations will occur to others upon the reading and understanding of this specification. It is intended to include all such modifications and alterations insofar as they come within the scope of the appended claims or the equivalents thereof.

We claim:

1. A line tensioner comprising:
   a tensioner body;
   a first bore extending through said tensioner body;
   a second bore extending through said tensioner body, said second bore being spaced from said first bore;
   a third bore extending through said tensioner body, said third bore being spaced from said first and second bores; and,
   a fourth bore extending through said tensioner body, said fourth bore being spaced from said first, second, and third bores, wherein said second and third bores are aligned so that a first line may be constructed such that it intersects and is perpendicular to a respective longitudinal centerline of each of said second and third bores and wherein said second and fourth bores are aligned so that a second line may be constructed such that it intersects and is perpendicular to the longitudinal centerline of the second bore and a longitudinal centerline of the fourth bore, wherein said second line is disposed at an acute angle in relation to said first line.

2. The tensioner of claim 1 further comprising a first countersunk area communicating with said first bore.

3. The tensioner of claim 2 further comprising a second countersunk area in said body, said second countersunk area communicating with said second and third bores, wherein said second countersunk area extends transversely to said second and third bores.

4. The tensioner of claim 3 further comprising a third countersunk area in said body, said third countersunk area communicating with said third and fourth bores, wherein said third countersunk area extends transversely to said third and fourth bores.

5. The tensioner of claim 4 wherein said third countersunk area is located on a side of said body opposite a side on which said second countersunk area is located.

6. The tensioner of claim 2 wherein a longitudinal centerline of said first countersunk area is co-linear with said longitudinal centerline of said first bore.

7. The tensioner of claim 1 wherein said first, second, third and fourth bores are non-intersecting.

8. The tensioner of claim 1 wherein said first, second, third and fourth bores are substantially parallel to each other.

9. A tensioning device, comprising:
   a tensioner body comprising a first side, a second side and at least two bores which extend from said first side to said second side;
   a line which extends through said tensioner body at least two bores; and,
   a means for selectively binding said line to prevent a sliding motion thereof in relation to said body, said means being located in said body and comprising:
   a first locking surface located on said first side of said body, and
   a second locking surface located on said second side of said body, wherein said second locking surface is positioned at an acute angle in relation to said first locking surface.

10. The tensioner of claim 9 wherein said at least two bores comprise a first bore and a second bore spaced from said first bore and wherein said first locking surface comprises a first countersunk area in said body, said first countersunk area communicating with said first and second bores, said line extending through said first bore, said first countersunk area and said second bore to form a loop.

11. The tensioner of claim 10 further comprising:
   a third bore extending from said body first side to said body second side, said third bore being spaced from said first and second bores; and,
   wherein said second locking surface comprises a second countersunk area in said body, said second countersunk area communicating with said second and third bores, said line extending through said second countersunk area and said third bore to form a second loop.

12. The tensioner of claim 11 further comprising:
   a fourth bore extending from said body first side to said body second side, said fourth bore being spaced from said first, second and third bores; and, a means for preventing a sliding motion of said line in one direction in said fourth bore past a preselected point.

13. The tensioner of claim 2 wherein said means for preventing a sliding motion comprises a third countersunk area in communication with said fourth bore.

14. The tensioner of claim 14 wherein said line comprises:
a first end which is selectively located in said fourth bore; and,
a second end which is secured to an adjacent section of said line by a fastening means to form a third loop.

15. An adjustable length, tensionable cargo strap device, comprising:
a tensioner body;
a first bore extending longitudinally through said tensioner body;
a line extending through said first bore and having a first end which is located adjacent said first bore;
a second bore extending longitudinally through said tensioner body, said second bore being spaced from said first bore;
a third bore extending longitudinally through said tensioner body, said third bore being spaced from said first and second bores; and,
a fourth bore extending longitudinally through said tensioner body, said fourth bore being spaced from said first, second, and third bores, wherein said line extends through said second, third, and fourth bores so as to form a first loop located on a first side of said tensioner body and a second loop located on a second side of said tensioner body;
a first attachment means slidably mounted on said first loop of said line and positioned on said first side of said tensioner body; and,
a second attachment means slidably mounted on said line and positioned on said second side of said tensioner body.

16. The device of claim 15 wherein at least one of said first and second attachment means comprises a hook.

17. The device of claim 15 further comprising a third attachment means which can be selectively mounted on said line, wherein said third attachment means can be spaced from said first and second attachment means.

18. The device of claim 15 further comprising a first countersunk area communicating with said first bore, wherein said line first end is selectively located in said first countersunk area.

19. The device of claim 18 further comprising a second countersunk area in said body, said second countersunk area communicating with said second and third bores, wherein said line is looped through said second bore, said second countersunk area, and said third bore to form said first loop.

20. The device of claim 19 further comprising a third countersunk area in said body, said third countersunk area communicating with said third and fourth bores, wherein said line is looped through said third countersunk area and said fourth bore to form said second loop.

21. The device of claim 15 wherein said line comprises an elongated stretchable member.

22. The device of claim 15 wherein a second end of said line is secured to an adjacent portion of said line by a fastening means to form a third loop.

23. The device of claim 22 wherein said second attachment means is located in said third loop.

24. The device of claim 15 wherein said first loop is formed in said line adjacent said first end thereof.

25. The device of claim 24 wherein said first attachment means is located in said first loop.

26. A line tensioner comprising:
a tensioner body;
a first bore extending through said tensioner body;
a second bore extending through said tensioner body, said second bore being spaced from said first bore;
a third bore extending through said tensioner body, said third bore being spaced from said first and second bores,
a fourth bore extending through said tensioner body, said fourth bore being spaced from said first, second, and third bores, wherein said second and third bores are aligned so that a first line intersects a respective longitudinal centerline of each of said second and third bores and wherein said second and fourth bores are aligned so that a second line intersects said longitudinal centerline of said second bore and a longitudinal centerline of said fourth bore;
a first locking surface located between said second and third bores; and,
a second locking surface located between said second and fourth bores, wherein said first line spans said first locking surface and said second line spans said second locking surface and wherein said second line intersects said first line at an acute angle.

27. The tensioner of claim 26 wherein said first locking surface is located on one side of said body and said second locking surface is located on an opposing side of said body.

28. The tension of claim 26 further comprising a line which extends through said first, second, third and fourth bores, wherein said line forms a first loop when extending through said second and third bores and a second loop when extending through said second and fourth bores.

29. The tensioner of claim 28 further comprising an anchor means attached to a first end of said line and a countersunk area communicating with said first bore, such that said countersunk area accommodates said anchor means located on said first end of said line.

* * * * *